US012206269B1

(12) United States Patent
Martin

(10) Patent No.: US 12,206,269 B1
(45) Date of Patent: Jan. 21, 2025

(54) RECHARGEABLE TELEVISION REMOTE

(71) Applicant: Jason Martin, Alexandria, VA (US)

(72) Inventor: Jason Martin, Alexandria, VA (US)

( * ) Notice: Subject to any disclaimer, the term of this patent is extended or adjusted under 35 U.S.C. 154(b) by 508 days.

(21) Appl. No.: 17/674,009

(22) Filed: Feb. 17, 2022

(51) Int. Cl.
*H01M 10/46* (2006.01)
*G08B 21/24* (2006.01)
*H02J 7/00* (2006.01)
*H04N 21/422* (2011.01)

(52) U.S. Cl.
CPC ............ *H02J 7/0044* (2013.01); *G08B 21/24* (2013.01); *H02J 7/0047* (2013.01); *H04N 21/42204* (2013.01)

(58) Field of Classification Search
CPC ...... H02J 7/0044; H02J 7/0047; G08B 21/24; H04N 21/42204
USPC .......................................... 320/107, 114, 115
See application file for complete search history.

(56) References Cited

U.S. PATENT DOCUMENTS

| 5,790,021 | A | 8/1998 | Mickel |
| D397,996 | S | 9/1998 | Smith |
| 7,554,443 | B1 | 6/2009 | Broderick |
| 7,817,035 | B2 | 10/2010 | Hardacker |
| 8,531,277 | B2 * | 9/2013 | Graham ................. G08B 21/24 340/384.3 |
| 10,142,577 | B1 | 11/2018 | Laird |
| 2009/0146605 | A1 * | 6/2009 | Uchiyama ................. H02J 7/32 320/101 |
| 2014/0375245 | A1 | 12/2014 | Strawderman |

FOREIGN PATENT DOCUMENTS

EP     2744176 A1 *   6/2014   ............... G06F 8/65

* cited by examiner

*Primary Examiner* — Edward Tso
(74) *Attorney, Agent, or Firm* — Kyle A. Fletcher, Esq.

(57) ABSTRACT

The rechargeable television remote is an electric device. The rechargeable television remote is configured for use with an audio-visual display. The rechargeable television remote remotely controls the operation of the audio visual display. The rechargeable television remote comprises a base station and a remote station. The base station is an electric device. The remote station is an electric device. The remote station forms a physical electric connection with the base station. The base station provides electric energy to the remote station through the physical electric connection. The base station and the remote station further communicate with each other using a wireless communication link. The base station transmits operating commands to the remote station through the wireless communication link. The remote station remotely controls the operation of the audio visual display.

9 Claims, 5 Drawing Sheets

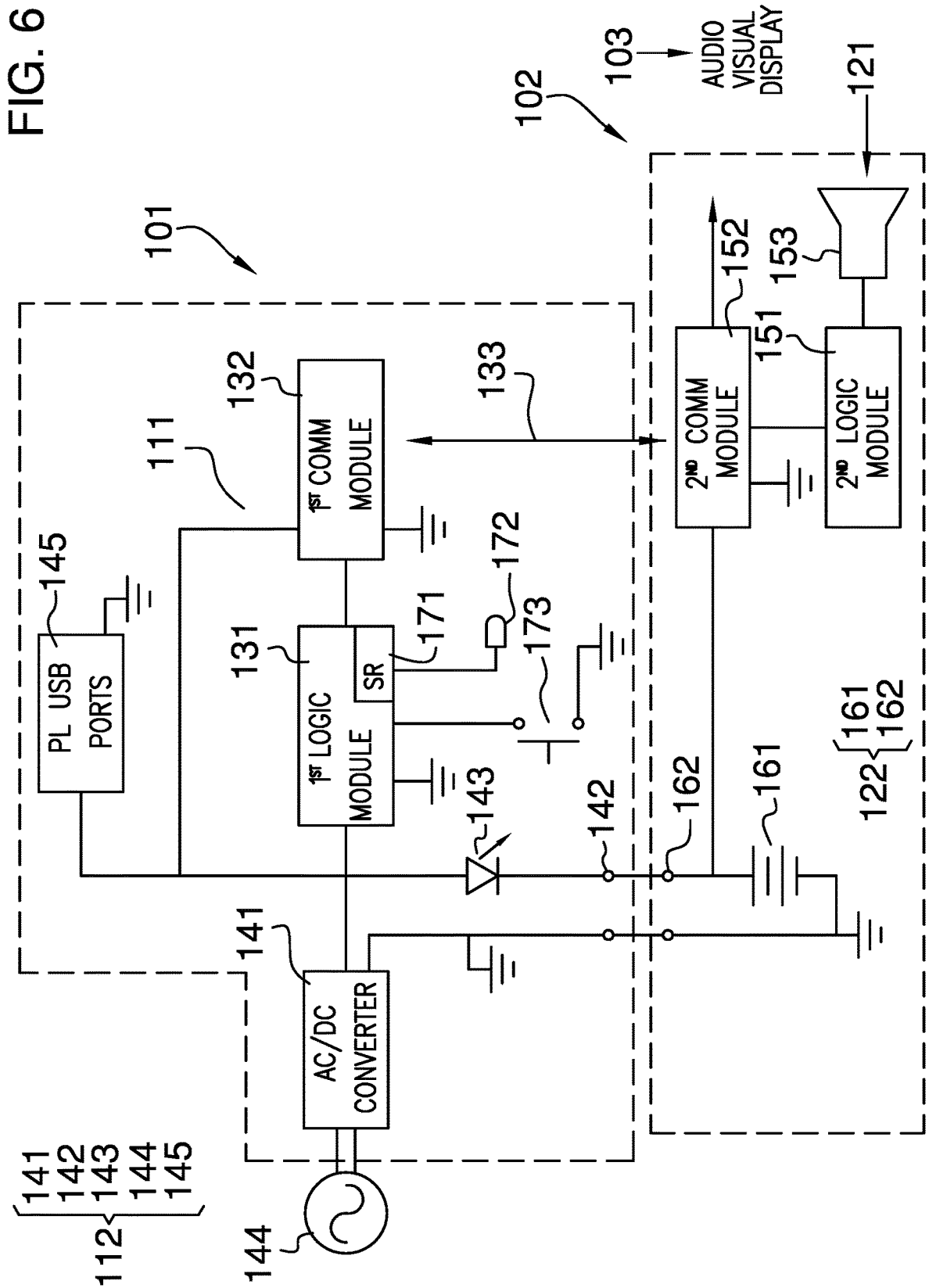

RECHARGEABLE TELEVISION REMOTE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of anti-loss alarm systems. (G08B21/24)

Summary of Invention

The rechargeable television remote is an electric device. The rechargeable television remote is configured for use with an audio-visual display. The rechargeable television remote remotely controls the operation of the audio visual display. The rechargeable television remote comprises a base station and a remote station. The base station is an electric device. The remote station is an electric device. The remote station forms a physical electric connection with the base station. The base station provides electric energy to the remote station through the physical electric connection. The base station and the remote station further communicate with each other using a wireless communication link. The base station transmits operating commands to the remote station through the wireless communication link. The remote station remotely controls the operation of the audio visual display.

These together with additional objects, features and advantages of the rechargeable television remote will be readily apparent to those of ordinary skill in the art upon reading the following detailed description of the presently preferred, but nonetheless illustrative, embodiments when taken in conjunction with the accompanying drawings.

In this respect, before explaining the current embodiments of the rechargeable television remote in detail, it is to be understood that the rechargeable television remote is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the rechargeable television remote.

It is therefore important that the claims be regarded as including such equivalent construction insofar as they do not depart from the spirit and scope of the rechargeable television remote. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

FIG. 6 is a schematic view of an embodiment of the disclosure.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
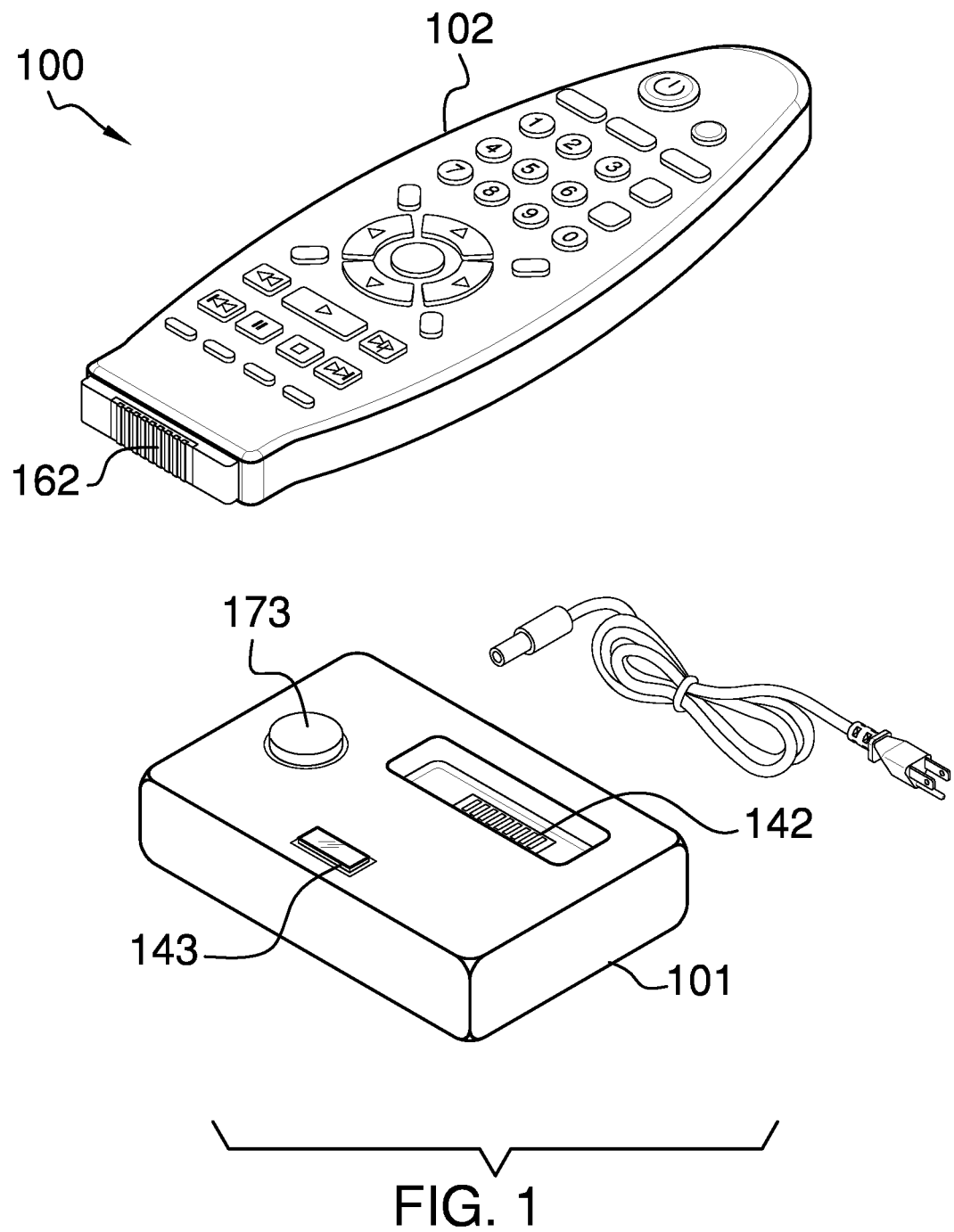
FIG. 1 is a perspective view of an embodiment of the disclosure.
Figure 2:
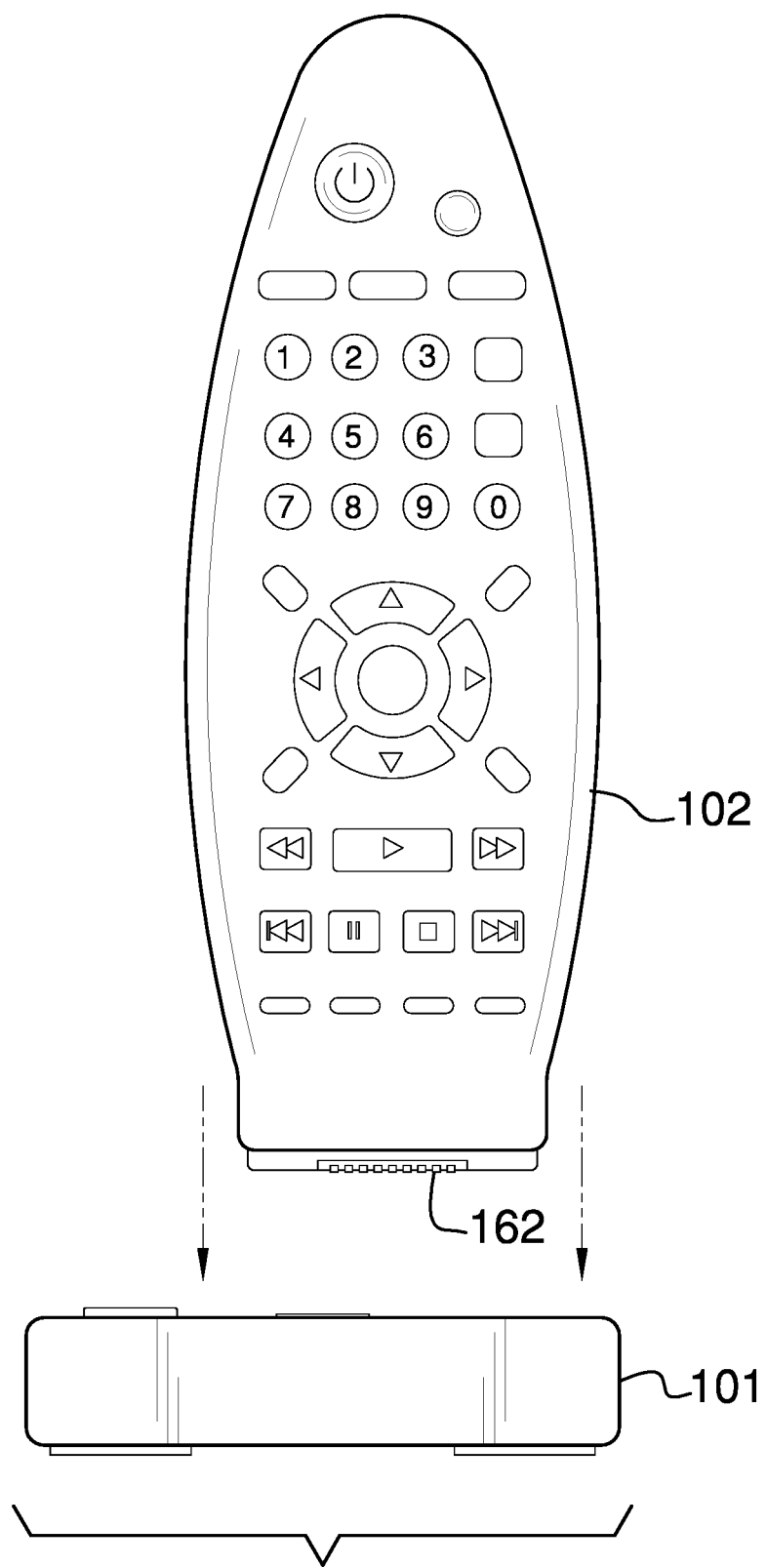
FIG. 2 is a front view of an embodiment of the disclosure.
Figure 3:
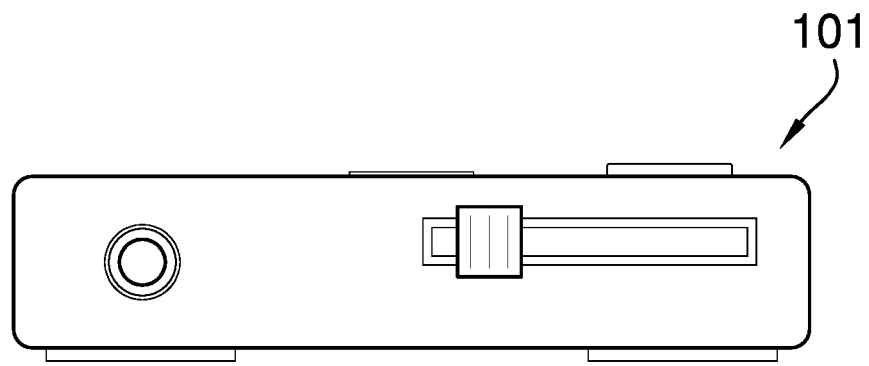
FIG. 3 is a rear view of an embodiment of the disclosure.
Figure 4:
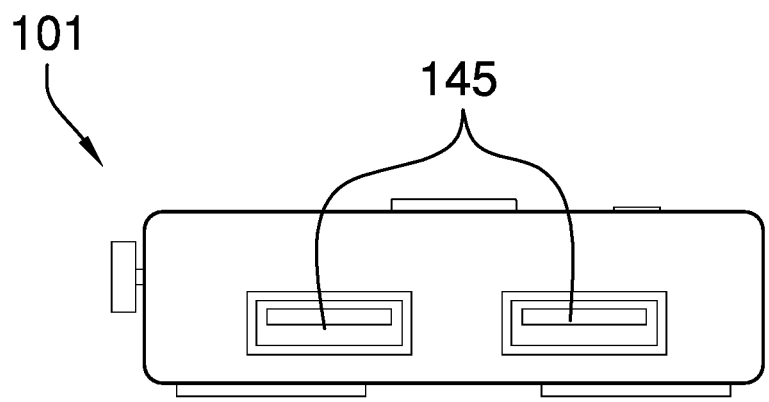
FIG. 4 is a side view of an embodiment of the disclosure.
Figure 5:
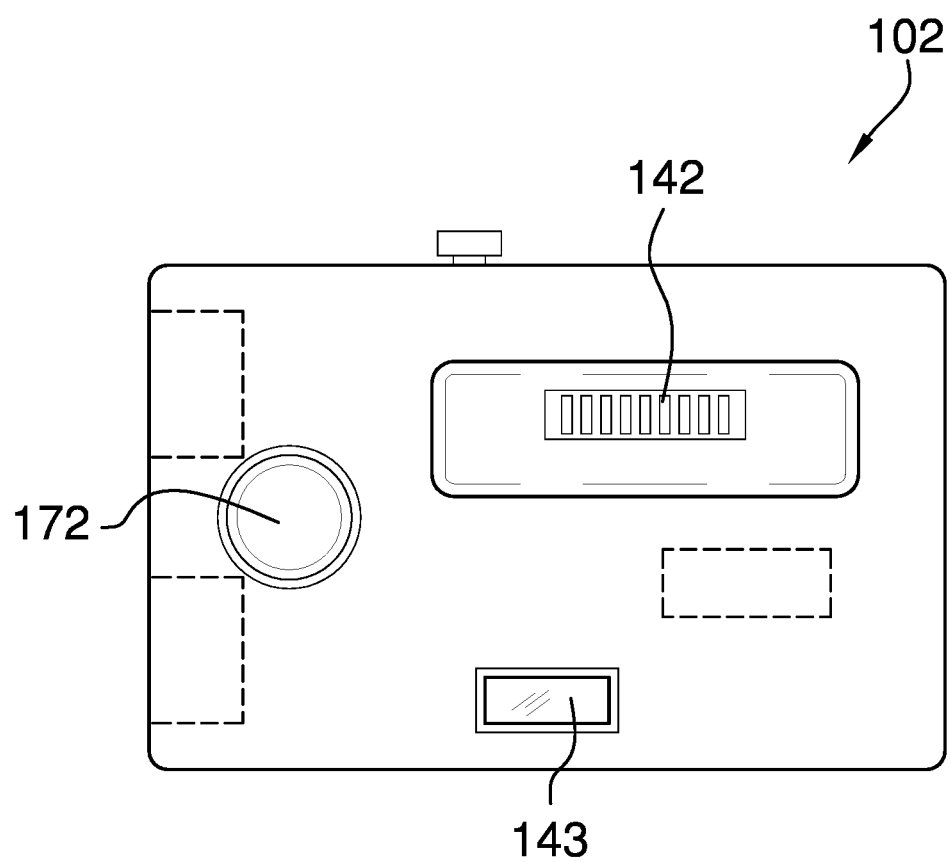
FIG. 5 is a top view of an embodiment of the disclosure.

Detailed reference will now be made to one or more potential embodiments of the disclosure, which are illustrated in FIGS. 1 through 6.

The rechargeable television remote 100 (hereinafter invention) is an electric device. The invention 100 is configured for use with an audio-visual display. The invention 100 remotely controls the operation of the audio visual display 103. The invention 100 comprises a base station 101 and a remote station 102. The base station 101 is an electric device. The remote station 102 is an electric device. The remote station 102 forms a physical electric connection with the base station 101. The base station 101 provides electric energy to the remote station 102 through the physical electric connection. The base station 101 and the remote station 102 further communicate with each other using a wireless communication link 133. The base station 101 transmits operating commands to the remote station 102 through the wireless communication link 133. The remote station 102 remotely controls the operation of the audio visual display 103.

The audio visual display 103 is an electric circuit. The audio visual display 103 presents information in a visual format. The audio visual display 103 presents information in an audible format. The operation of the audio visual display 103 is remotely controlled by the remote station 102.

The base station 101 is an electric circuit. The base station 101 forms a physical electric connection with the remote station 102. The base station 101 provides electric energy to the remote station 102 over the physical electric connection. The base station 101 forms a wireless communication link 133 with the remote station 102. The base station 101 transmits operating instructions to the remote station 102 through the wireless communication link 133.

The base station 101 sends a first transmission that initiates the remote station 102 to announce an audible sound used to identify the physical location of the remote station 102. The base station 101 monitors the vicinity surrounding the base station 101 for audible sounds. The base station 101 process all captured audible sounds to determine if an operating instruction has been announced. If the base station 101 determines that an operating instruction has been announced, the base station 101 sends a second transmission to the remote station 102. The second transmission initiates the remote station 102 to take the appropriate action.

The base station 101 comprises a first control circuit 111 and a first power circuit 112. The first control circuit 111 and the first power circuit 112 are electrically interconnected.

The first control circuit 111 is an electric circuit. The first control circuit 111 controls the operation of the base station 101. The first control circuit 111 forms the wireless communication link 133 with the remote station 102. The first control circuit 111 transmits operating instructions to the remote station 102 through the wireless communication link 133.

The first control circuit 111 sends a first transmission that initiates the remote station 102 to announce an audible sound used to identify the physical location of the remote station 102. The first control circuit 111 monitors the vicinity surrounding the first control circuit 111 for audible sounds. The first control circuit 111 process all captured audible sounds to determine if an operating instruction has been announced. If the first control circuit 111 determines that an operating instruction has been announced, then the first control circuit 111 sends a second transmission to the remote station 102. The second transmission is encoded with the operating instruction. The first control circuit 111 comprises a first logic module 131 and a first communication module 132. The first logic module 131 and the first communication module 132 are electrically interconnected. The first communication module 132 further comprises a wireless communication link 133. The wireless communication link 133 forms a communication link between the base station 101 and the remote station 102.

The first logic module 131 is a programmable electronic device that is used to manage, regulate, and operate the first control circuit 111. The first communication module 132 is a wireless electronic communication device that allows the first logic module 131 to wirelessly communicate with the remote station 102. Specifically, the first communication module 132 establishes a wireless communication link 133 between the first control circuit 111 and the remote station 102. The first communication module 132 supports a communication protocol selected from the group consisting of a WiFi™ protocol or a Bluetooth™ protocol.

The first communication module 132 receives the first transmission from the first logic module 131. The first communication module 132 subsequently retransmits the first transmission to the remote station 102 for further processing. The first communication module 132 receives the second transmission from the first logic module 131. The first communication module 132 subsequently retransmits the first transmission to the remote station 102 for further processing.

The first logic module 131 further comprises a speech recognition module 171, a microphone 172, and a page switch 173. The first logic module 131 comprises a speech recognition module 171, a microphone 172, and a page switch 173. The first logic module 131 electrically connects to the microphone 172. The first logic module 131 electrically connects to the page switch 173. The first logic module 131 operates the speech recognition module 171

The speech recognition module 171 is a module operated by the first logic module 131. The speech recognition module 171 receives a digital representation of sound that is captured by the microphone 172 from the first logic module 131. The speech recognition module 171 analyzes the received digital representation of the sound to determine if an announcement of actionable information was received. The speech recognition module 171 transmits any identified actionable information back to the first logic module 131. The first logic module 131 encodes the received actionable information into the second transmission.

The microphone 172 is a transducer. The microphone 172 captures audible sounds that are within range of the base station 101. The microphone 172 converts acoustic energy into an electric signal that is transmitted to the first logic module 131. The first logic module 131 converts the received electric signal into a digital representation of the audible sounds that are further processed by the speech recognition module 171.

The page switch 173 is a momentary switch. The page switch 173 electrically connects to the first logic module 131. The first logic module 131 monitors the page switch 173. The actuation of the page switch 173 initiates the first logic module 131 to transmit the first transmission to the remote station 102.

The first power circuit 112 is an electric circuit. The first power circuit 112 powers the operation of the first control circuit 111. The first power circuit 112 forms the physical electric connection with the remote station 102. The first power circuit 112 provides electric energy to the remote station 102 over the physical electric connection. The first power circuit 112 further comprises an ac/dc converter 141, a charging port 142, an LED 143, and a plurality of USB ports 145. The ac/dc converter 141, the charging port 142, and the LED 143 are electrically interconnected. The ac/dc converter 141 further comprises a national electric grid 144. The national electric grid 144 electrically connects to the ac/dc converter 141.

The ac/dc converter 141 is an electric circuit. The ac/dc converter 141 receives ac electric energy from an externally provided source and converts the received ac electric energy into dc electric energy. The dc electric energy generated by the ac/dc converter 141 provides the dc electric energy necessary to operate the plurality of USB ports 145. The dc electric energy generated by the ac/dc converter 141 provides the dc electric energy necessary to operate the first control circuit 111. The dc electric energy generated by the ac/dc converter 141 provides the dc electric energy necessary to operate the remote station 102. The dc electric energy generated by the ac/dc converter 141 is presented to the charging port 142 as a dc voltage. The national electric grid 144 is an externally provided source of ac electric energy. The national electric grid 144 is defined elsewhere in this disclosure.

The charging port 142 is an electric plug. The charging port 142 forms an electric connection with the ac/dc converter 141. The charging port 142 further forms an electric connection with the second power circuit 122 of the remote station 102. The charging port 142 transmits the dc electric energy received from the ac/dc converter 141 to the second power circuit 122.

The LED 143 is a light emitting diode. The LED 143 forms a series electrical connection between the ac/dc converter 141 and the charging port 142. The LED 143 limits the flow of electric energy to a single direction. The LED 143 further generates an illumination when an electric current flows through the LED 143. The LED 143 is used to illuminate a visible signal when dc electric energy is flowing from the charging port 142 into the second power circuit 122. The LED 143 is used to prevent the back flow of electric energy from the second power circuit 122 into the ac/dc converter 141.

Each port selected from the plurality of USB ports 145 electrically connects to the ac/dc converter 141. Each port selected from the plurality of USB ports 145 draws dc electric energy from the ac/dc converter 141. Each port selected from the plurality of USB ports 145 presents a dc voltage that can be used to provide dc electric energy to an externally provided electric device. Each port selected from the plurality of USB ports 145 presents a plug that is compatible with the Universal Serial Bus standard. The plurality of USB ports 145 presents a dc voltage that is compatible with the Universal Serial Bus standard.

The remote station 102 is an electric circuit. The remote station 102 remotely controls the operation of the audio visual display 103. The remote station 102 forms a physical electric connection with the base station 101. The remote station 102 draws electric energy from the base station 101 over the physical electric connection. The remote station 102 receives the first transmission from the base station 101. On receiving the first transmission, the remote station 102 initiates an audible announcement. The remote station 102 receives the second transmission from the base station 101. On receiving the second transmission, the remote station 102 implements the operating instruction contained in the second transmission. The remote station 102 comprises a second control circuit 121 and a second power circuit 122. The second control circuit 121 and the second power circuit 122 are electrically interconnected.

The second control circuit 121 is an electric circuit. The second control circuit 121 controls the operation of the remote station 102. The second control circuit 121 remotely controls the operation of the audio visual display 103. The second control circuit 121 receives the first transmission from the base station 101. On receiving the first transmission, the second control circuit 121 initiates an audible announcement. The second control circuit 121 receives the second transmission from the base station 101. On receiving the second transmission, the second control circuit 121 implements the operating instruction contained in the second transmission. The second control circuit 121 comprises a second logic module 151, a second communication module 152, and a speaker 153. The second logic module 151, the second communication module 152, and the speaker 153 are electrically interconnected. The second communication module 152 establishes the wireless communication link 133 with the first communication module 132.

The second logic module 151 is a programmable electronic device that is used to manage, regulate, and operate the second control circuit 121. The second communication module 152 is a wireless electronic communication device that allows the second logic module 151 to wirelessly communicate with the first communication module 132 of the base station 101. Specifically, the second communication module 152 establishes the wireless communication link 133 between the second control circuit 121 and the first communication module 132 of the base station 101. The second communication module 152 supports the same communication protocol as the first communication module 132.

The second communication module 152 receives the first transmission from the first communication module 132 of the base station 101. The second communication module 152 subsequently retransmits the received first transmission to the second logic module 151. to the remote station 102. The second communication module 152 receives the second transmission from the first communication module 132 of the base station 101. The second communication module 152 subsequently retransmits the received second transmission to the second logic module 151.

The speaker 153 is a transducer. The speaker 153 receives an electric signal from the second control circuit 121. The speaker 153 converts the received electric signal into an audible sound that is announced by the speaker 153. The sound announced by the speaker 153 is a paging beacon used to identify the location of the remote station 102.

The second power circuit 122 is an electric circuit. The second power circuit 122 powers the operation of the second control circuit 121. The second power circuit 122 forms the physical electric connection with the first power circuit 112 of the base station 101. The second power circuit 122 draws 13 electric energy from the first power circuit 112 of the base station 101 over the physical electric connection. The second power circuit 122 comprises a battery 161 and a charging plug 162. The charging plug 162 electrically connects the battery 161 to the first control circuit 111 of the base station 101.

The battery 161 is a commercially available rechargeable battery 161. The chemical energy stored within the rechargeable battery 161 is renewed and restored through use of the charging plug 162. The AC/DC Converter 141 receives AC electric energy from a national electric grid 144 and converts the received AC electric energy into DC electric energy. The charging plug 162 is an electrical circuit that reverses the polarity of the rechargeable battery 161 and provides the energy necessary to reverse the chemical processes that the rechargeable battery 161 initially used to generate the electrical energy. This reversal of the chemical process creates a chemical potential energy that will later be used by the rechargeable battery 161 to generate electricity.

The charging plug 162 electrically connects to the charging port 142. The charging plug 162 forms an electrical connection to the charging port 142. The charging plug 162 forms a detachable electrical connection with the charging port 142. The charging plug 162 receives electrical energy from the ac/dc converter 141 through the charging port 142.

The following definitions were used in this disclosure:

AC: As used in this disclosure, AC is an acronym for alternating current.

AC/DC Converter: As used in this disclosure, an AC/DC converter is an electrical device that converts an AC voltage into a regulated DC voltage by rectifying and regulating the AC voltage. Method to design and build AC/DC converters are well known in the electrical arts. The AC/DC converter is further defined with a positive terminal, a negative terminal and a power input.

Announce: As used in this disclosure, to announce means to generate audible sounds over a transducer.

Audio-Visual Display: As used in this disclosure, an audio-visual display is a display device that further comprises a speaker such that the audio-visual display simultaneously presents visual and audible information in a coordinated manner.

Battery: As used in this disclosure, a battery is a chemical device consisting of one or more cells, in which chemical energy is converted into electricity and used as a source of power. Batteries are commonly defined with a positive terminal and a negative terminal.

Bluetooth™: As used in this disclosure, Bluetooth™ is a standardized communication protocol that is used to wirelessly interconnect electronic devices.

Control Circuit: As used in this disclosure, a control circuit is an electrical circuit that manages and regulates the behavior or operation of a device.

Communication Link: As used in this disclosure, a communication link refers to the structured exchange of data between two objects.

DC: As used in this disclosure, DC is an acronym for direct current.

Diode: As used in this disclosure, a diode is a two terminal semiconductor device that allows current flow in only one direction. The two terminals are called the anode and the cathode. Electric current is allowed to pass from the anode to the cathode.

Display: As used in this disclosure, a display is a surface upon which is presented an image, potentially including, but not limited to, graphic images and text, that is interpretable by an individual viewing the projected image in a meaningful manner. A display device refers to an electrical device used to present these images.

External Power Source: As used in this disclosure, an external power source is a source of the energy that is externally provided to enable the operation of the present disclosure. Examples of external power sources include, but are not limited to, electrical power sources and compressed air sources.

Logic Module: As used in this disclosure, a logic module is a readily and commercially available electrical device that accepts digital and analog inputs, processes the digital and analog inputs according to previously specified logical processes and provides the results of these previously specified logical processes as digital or analog outputs. The disclosure allows, but does not assume, that the logic module is programmable.

Maintained Switch: As used in this disclosure, a maintained switch is a switch that maintains the position that was set in the most recent switch actuation. A maintained switch works in an opposite manner to a momentary switch.

Microphone: As used in this disclosure, a microphone is a transducer that converts the energy from vibration into electrical energy. The sources of vibrations include, but are not limited to, acoustic energy.

Momentary Switch: As used in this disclosure, a momentary switch is a biased switch in the sense that the momentary switch has a baseline position that only changes when the momentary switch is actuated (for example when a pushbutton switch is pushed or a relay coil is energized). The momentary switch then returns to the baseline position once the actuation is completed. This baseline position is called the "normal" position. For example, a "normally open" momentary switch interrupts (open) the electric circuit in the baseline position and completes (closes) the circuit when the momentary switch is activated. Similarly, a "normally closed" momentary switch will complete (close) an electric circuit in the baseline position and interrupt (open) the circuit when the momentary switch is activated.

National Electric Grid: As used in this disclosure, the national electric grid is a synchronized and highly interconnected electrical network that distributes energy in the form of electric power from a plurality of generating stations to consumers of electricity. The national electric grid is a commercially available source of AC electrical power. The national electric grid is regulated by an appropriate authority. The national electric grid comprises one or more utilities that sell electrical power for use by an electrical load. The national electric grid invoices for electrical power based on the total energy consumed by the electrical load. The national electric grid measures the energy consumption of an electrical load with an electrical meter. The national electric grid provides power through electrical connections known as a hot lead and a neutral lead.

Plug: As used in this disclosure, a plug is an electrical termination that electrically connects a first electrical circuit to a second electrical circuit or a source of electricity. As used in this disclosure, a plug will have two or three metal pins.

Port: As used in this disclosure, a port is an electrical termination that is used to connect a first electrical circuit to a second external electrical circuit. In this disclosure, the port is designed to receive a plug.

Remote Control: As used in this disclosure, remote control means the establishment of control of a device from a distance. Remote control is generally accomplished through the use of an electrical device that generates electrically based control signals that are transmitted via radio frequencies or other means to the device.

Speaker: As used in this disclosure, a speaker is an electrical transducer that converts an electrical signal into an audible sound.

Speech Recognition: As used in this disclosure, speech recognition refers to a collection of commercially available algorithms that capture process a digital representation of an audible sound in a manner that allows an electronically operated device, such as a computer, to extract data from the digital representation of an audible sound and take a subsequent action based on the data extracted from the audible sound.

Switch: As used in this disclosure, a switch is an electrical device that starts and stops the flow of electricity through an electric circuit by completing or interrupting an electric circuit. The act of completing or breaking the electrical circuit is called actuation. Completing or interrupting an electric circuit with a switch is often referred to as closing or opening a switch respectively. Completing or interrupting an electric circuit is also often referred to as making or breaking the circuit respectively.

Transducer: As used in this disclosure, a transducer is a device that converts a physical quantity, such as pressure or brightness into an electrical signal or a device that converts an electrical signal into a physical quantity.

USB: As used in this disclosure, USB is an acronym for Universal Serial Bus which is an industry standard that defines the cables, the connectors, the communication protocols and the distribution of power required for interconnections between electronic devices. The USB standard defines several connectors including, but not limited to, USB-A, USB-B, mini-USB, and micro USB connectors. A USB cable refers to a cable that: 1) is terminated with USB connectors; and, 2) that meets the data transmission standards of the USB standard.

WiFi™: As used in this disclosure, WiFi™ refers to the physical implementation of a collection of wireless electronic communication standards commonly referred to as IEEE 802.11x.

Wireless: As used in this disclosure, wireless is an adjective that is used to describe a communication link between two devices that does not require the use of physical cabling.

Wireless Communication Establishment Technology: As used in this disclosure, a wireless communication establishment technology refers to technology that establishes a wireless communication link between a first logical device and a second logical device. Usually, the operation of a wireless communication establishment technology is initiated by the push of a button. An example of such a technology is the WiFi™ protected setup technology (WPS™).

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A rechargeable television remote comprising
    a base station and a remote station;
    wherein the base station is an electric device;
    wherein the remote station is an electric device;
    wherein the remote station forms a physical electric connection with the base station, such that the base station is able to utilize the physical electric connection with the remote station;
    wherein the base station and the remote station further communicate with each other using a wireless communication link;
    wherein the rechargeable television remote remotely controls the operation of the audio-visual display;
    wherein the base station transmits operating instructions to the remote station through the wireless communication link;
    wherein the base station sends a first transmission that initiates the remote station to announce an audible sound used to identify the physical location of the remote station;
    wherein the base station monitors the vicinity surrounding the base station for audible sounds;
    wherein the base station process all captured audible sounds to determine if an operating instruction has been announced;
    wherein if the base station determines that an operating instruction has been announced, the base station sends a second transmission to the remote station;
    wherein the second transmission initiates the remote station to take the appropriate action.

2. The rechargeable television remote according to claim 1
    wherein the rechargeable television remote is an electric device;
    wherein the rechargeable television remote is configured for use with an audio-visual display.

3. The rechargeable television remote according to claim 2
    wherein the remote station is an electric circuit;
    wherein the remote station remotely controls the operation of the audio visual display;
    wherein the remote station forms a physical electric connection with the base station;
    wherein the remote station draws electric energy from the base station over the physical electric connection;
    wherein the remote station receives the first transmission from the base station;
    wherein on receiving the first transmission, the remote station initiates an audible announcement;
    wherein the remote station receives the second transmission from the base station;
    wherein on receiving the second transmission, the remote station implements the operating instruction contained in the second transmission.

4. The rechargeable television remote according to claim 3
    wherein the base station comprises a first control circuit and a first power circuit;
    wherein the first control circuit and the first power circuit are electrically interconnected;
    wherein the remote station comprises a second control circuit and a second power circuit;
    wherein the second control circuit and the second power circuit are electrically interconnected.

5. The rechargeable television remote according to claim 4
    wherein the first control circuit is an electric circuit;
    wherein the first control circuit controls the operation of the base station;
    wherein the first control circuit forms the wireless communication link with the remote station;
    wherein the first control circuit transmits operating instructions to the remote station through the wireless communication link;
    wherein the first control circuit sends a first transmission that initiates the remote station to announce an audible sound used to identify the physical location of the remote station;
    wherein the first control circuit monitors the vicinity surrounding the first control circuit for audible sounds;
    wherein the first control circuit process all captured audible sounds to determine if an operating instruction has been announced;
    wherein if the first control circuit determines that an operating instruction has been announced, then the first control circuit sends a second transmission to the remote station;
    wherein the second transmission is encoded with the operating instruction;
    wherein the second control circuit is an electric circuit;
    wherein the second control circuit controls the operation of the remote station;
    wherein the second control circuit remotely controls the operation of the audio visual display;
    wherein the second control circuit receives the first transmission from the base station;
    wherein on receiving the first transmission, the second control circuit initiates an audible announcement;
    wherein the second control circuit receives the second transmission from the base station;
    wherein on receiving the second transmission, the second control circuit implements the operating instruction contained in the second transmission.

6. The rechargeable television remote according to claim 5
    wherein the first power circuit is an electric circuit;
    wherein the first power circuit powers the operation of the first control circuit;
    wherein the first power circuit forms the physical electric connection with the remote station;

wherein the first power circuit provides electric energy to the remote station over the physical electric connection;

wherein the second power circuit is an electric circuit;

wherein the second power circuit powers the operation of the second control circuit;

wherein the second power circuit forms the physical electric connection with the first power circuit of the base station;

wherein the second power circuit draws electric energy from the first power circuit of the base station over the physical electric connection.

7. The rechargeable television remote according to claim 6 wherein the first control circuit comprises a first logic module and a first communication module;

wherein the first logic module and the first communication module are electrically interconnected;

wherein the first communication module further comprises the wireless communication link;

wherein the second control circuit comprises a second logic module, a second communication module, and a speaker;

wherein the second logic module, the second communication module, and the speaker are electrically interconnected;

wherein the second communication module establishes the wireless communication link with the first communication module;

wherein the speaker is a transducer;

wherein the speaker receives an electric signal from the second control circuit;

wherein the speaker converts the received electric signal into an audible sound that is announced by the speaker.

8. The rechargeable television remote according to claim 7 wherein the first logic module is a programmable electronic device;

wherein the first communication module is a wireless electronic communication;

wherein the first communication module establishes a wireless communication link between the first control circuit and the remote station;

wherein the first communication module receives the first transmission from the first logic module;

wherein the first communication module subsequently retransmits the first transmission to the remote station for further processing;

wherein the first communication module receives the second transmission from the first logic module;

wherein the first communication module subsequently retransmits the first transmission to the remote station for further processing;

wherein the second logic module is a programmable electronic;

wherein the second communication module is a wireless electronic communication device that allows the second logic module to wirelessly communicate with the first communication module of the base station;

wherein specifically, the second communication module establishes the wireless communication link between the second control circuit and the first communication module of the base station;

wherein the second communication module supports the same communication protocol as the first communication module;

wherein the second communication module receives the first transmission from the first communication module of the base station;

wherein the second communication module subsequently retransmits the received first transmission to the second logic module;

wherein the second communication module receives the second transmission from the first communication module of the base station;

wherein the second communication module subsequently retransmits the received second transmission to the second logic module.

9. The rechargeable television remote according to claim 8 wherein the first logic module further comprises a speech recognition module, a microphone, and a page switch;

wherein the first logic module comprises a speech recognition module, a microphone, and a page switch;

wherein the first logic module electrically connects to the microphone;

wherein the first logic module electrically connects to the page switch;

wherein the first logic module operates the speech recognition module wherein the speech recognition module is a module operated by the first logic module;

wherein the speech recognition module receives a digital representation of sound that is captured by the microphone from the first logic module;

wherein the speech recognition module analyzes the received digital representation of the sound to determine if an announcement of actionable information was received;

wherein the speech recognition module transmits any identified actionable information back to the first logic module;

wherein the first logic module encodes the received actionable information into the second transmission;

wherein the microphone is a transducer;

wherein the microphone captures audible sounds that are within range of the base station;

wherein the microphone converts acoustic energy into an electric signal that is transmitted to the first logic module;

wherein the first logic module converts the received electric signal into a digital representation of the audible sounds that are further processed by the speech recognition module;

wherein the page switch is a momentary switch;

wherein the page switch electrically connects to the first logic module;

wherein the first logic module monitors the page switch;

wherein the actuation of the page switch initiates the first logic module to transmit the first transmission to the remote station.

\* \* \* \* \*